United States Patent [19]

Lauter et al.

[11] Patent Number: 5,362,472
[45] Date of Patent: Nov. 8, 1994

[54] METHOD OF MANUFACTURING AQUEOUS CERAMIC SUSPENSIONS AND THE USE OF SAID SUSPENSIONS

[75] Inventors: Josef Lauter, Aachen; Walter Mayr, Würselen; Joachim Opitz, Aachen; Gerd Romanowski, Nidderau Heldenbergen, all of Germany

[73] Assignee: U.S. Philips Corporation, New York, N.Y.

[21] Appl. No.: 941,340

[22] Filed: Sep. 4, 1992

[30] Foreign Application Priority Data

Sep. 13, 1991 [DE] Germany ............................. 4130441

[51] Int. Cl.$^5$ .................... C01G 23/00; C04B 35/46
[52] U.S. Cl. ..................... 423/598; 501/137
[58] Field of Search ................. 501/137; 423/598, 608, 423/593

[56] References Cited

U.S. PATENT DOCUMENTS

| | | | |
|---|---|---|---|
| 4,569,920 | 2/1986 | Smith-Johannsen | 501/1 |
| 4,643,984 | 2/1987 | Abe et al. | 423/598 |
| 4,829,033 | 5/1989 | Menashi et al. | 423/598 |
| 4,832,939 | 5/1989 | Menashi et al. | 423/598 |
| 4,859,448 | 8/1989 | Klee et al. | 423/598 |
| 4,874,598 | 10/1989 | Oda et al. | 423/598 |
| 4,898,843 | 2/1990 | Matushita et al. | 423/593 |
| 4,904,411 | 2/1990 | Novich et al. | 501/137 |
| 4,999,181 | 3/1991 | Klee et al. | 423/608 |
| 5,028,362 | 7/1991 | Janney et al. | 501/1 |
| 5,066,617 | 11/1991 | Tanemoto et al. | 423/598 |
| 5,087,437 | 2/1992 | Bruno et al. | 423/593 |

FOREIGN PATENT DOCUMENTS

| | | | |
|---|---|---|---|
| 150135 | 7/1985 | European Pat. Off. | 501/137 |
| 88/07505 | 10/1988 | WIPO . | |
| 89/07583 | 8/1989 | WIPO . | |

*Primary Examiner*—Anthony Green
*Attorney, Agent, or Firm*—Paul R. Miller

[57] ABSTRACT

A method describing the manufacture and use of aqueous suspensions comprising fine-powdered ceramic solid particles, dispersing agents and, if necessary, binders, in which method the manufacture of the suspensions includes the following process steps which are carried out separately or in combination:

washing the solid particles in water before preparing the suspension;

adding anionic compounds, in the form of sulphates, carbonates, iodates, chromates, oxalates, citrates and/or tartrates;

manufacturing the suspensions and/or storing the finished suspensions in a $CO_2$-free gaseous atmosphere;

manufacturing the suspensions and storing the finished suspensions at a temperature below 20° C., preferably below 15° C.;

adding additional dispersing agents to the suspension at a time when reagglomeration of the solid particles in the suspension has not yet started or just started.

26 Claims, No Drawings

METHOD OF MANUFACTURING AQUEOUS CERAMIC SUSPENSIONS AND THE USE OF SAID SUSPENSIONS

The invention relates to a method of manufacturing aqueous suspensions comprising fine-powdered ceramic solid particles, dispersing agents and, if necessary, binders.

The invention further relates to the use of such suspensions.

BACKGROUND OF THE INVENTION

Suspensions consisting of powdery ceramic material, a solvent or mixture of solvents, one or more than one organic polymeric binders, softeners and dispersing agents are used, for example, to cast thin ceramic green foils which are dried and then subjected to further processing to form electronic components such as, for example, ceramic multilayer capacitors.

A ceramic material of particular interest is barium titanate which is used for the manufacture of ceramic multilayer capacitors because it has a high dielectric constant. In this manufacturing process, in particular, organic solvent systems are used in which the ceramic powder is dispersed and to which organic polymeric binders, softeners and dispersing agents are added to form the casting slip for the foil. To cast thin foils having a thickness $>2$ $\mu m$ and exhibiting an improved homogeneity and strength, the aqueous suspensions must consist of very fine-powdered barium titanate having particle sizes smaller than 0.5 $\mu m$, preferably in the range from 0.1 to 0.2 $\mu m$.

However, besides the average size and the size distribution of the solid primary particles of the ceramic material, also the state of agglomeration of the solid particles in the suspension is also important for attaining a uniform, trouble-free structure of the green foils. For example, it is being recognized more and more that homogeneous, densely packed green foils can only be obtained when the solid particles present in the suspension are completely deagglomerated, individual primary particles, because particle agglomerates and particle aggregates cause the formation of relatively large cavities, bubbles, holes and inclusions which adversely affect the homogeneity and strength of the foils.

A complete deagglomeration of the powder particles is very important, in particular, in the manufacture of very thin foils because in this case the above-mentioned defects caused by particle agglomerates very adversely affect the foil properties. The reason for this being that as the foil thickness decreases, the foil-thickness-related relative dimension of the defect increases. This brings about a deterioration of the homogeneity and strength of the foil.

In addition, complete particle deagglomeration is very difficult, in particular, when very fine materials having an average particle size $<0.5$ $\mu m$ are used, because as a result of the small particle diameter and the large surfaces very strong, attractive interactions between the particles take place.

As disclosed in, for example, Japanese Reference No. 62-169480, deagglomeration of very fine solid particles in an aqueous suspension can be attained by subjecting the suspension to ultrasound.

Close examination of such known suspensions reveal, however, that this ideal, deagglomerated condition is not stable for any desired length of time. After a certain time, ranging between 0 minutes and 4 hours, which is governed to a substantial degree by the solid content of the suspension and by the concentration of the polymeric organic binder, the suspensions become unstable, i.e. the particles start to agglomerate.

However, the undesired reagglomeration of the individual primary particles is retarded by suitable dispersing agents. Dispersing agents generate repulsive forces between particles, which forces are in opposition to the attractive forces acting between the particles. It is known that in aqueous systems polyelectrolytes, in particular those having a degree of polymerization in the range from 20 to 100, can very suitably be used for this purpose. Such dispersing agents are adsorbed onto the particle surface and, as a result of their numerous charged functional groups, such as $-COO^-$ or $-NH_3^+$, cause the particle surface to be charged. The particles which now carry like charges repel one another electrostatically. In general, these electrostatic repulsive forces are much greater than the attractive interactions based on dispersive van der Waals' forces.

The above-mentioned unstable behaviour of the suspensions used for the manufacture of the foils constitutes a major drawback for the practical application of the method on an industrial scale.

As the presence of particle agglomerates adversely affects the properties of the foil, the casting slip should be processed before the onset of agglomeration. However, at characteristic stability times of 0 minutes to 4 hours, this would impose substantial limitations on the steps in the production process. Besides, to ensure constant foil properties in the casting process, the suspensions would have to be manufactured in quantities which can be processed completely into foils within a time range of 0 minutes to 4 hours. However, such a method would be uneconomical and, in addition, would adversely affect the reproducibility of the individual, much to small, batches of suspensions. This means that the suspensions used must be stable for at least 15 to 25 hours. When the loss of time caused by the necessary timely coordination of the various process steps is included, a period of approximately 40 hours in which the state of agglomeration of the suspensions should remain constant, is desirable.

SUMMARY OF THE INVENTION

It is an object of the invention to improve the long-time stability of aqueous suspensions containing fine solid particles, dispersing agents and, if necessary, polymeric organic binders and, if necessary, softeners, in such a manner that reagglomeration of the primary particles is precluded.

This object is achieved according to the invention in that in the manufacture of the suspensions the following process steps are carried out separately or in combination:
  washing the solid particles in water before preparing the suspension;
  adding anionic compounds, in particular in the form of sulphates, carbonates, iodates, chromates, oxalates, citrates and/or tartrates;
  manufacturing the suspensions and/or storing the finished suspensions in a $CO_2$-free gaseous atmosphere;
  manufacturing the suspensions and storing the finished suspensions at a temperature below 20° C., preferably below 15° C.;

adding additional dispersing agents to the suspension at a time when reagglomeration of the solid particles in the suspension has not yet started or just started.

Surprisingly it has been found that the long-time stability of aqueous suspensions of the type mentioned in the opening paragraph can be improved by a series of very different measures. Such measures are based on modifying the chemical composition of the suspension by adding or excluding certain substances or by changing physical conditions under which the suspensions are manufactured or stored.

The reagglomeration process is retarded by cooling the suspensions to temperatures below 20° C., preferably below 15° C. This results in a substantial improvement of the stability of the suspensions.

A measure which is also effective consists in that the solid particles are thoroughly washed before the suspensions are prepared. To this end, the powdery starting material is dispersed in water and allowed to stand for a prolonged period of time. The solid content is then separated from the liquid phase by filtering or centrifuging and is thoroughly washed with water. Suspensions and slip manufactured by means of the washed solid particles exhibit a substantially improved long-time stability.

A further effective measure for stabilizing the suspension consists in excluding the carbon dioxide present in the atmosphere. This can be achieved, for example, by continuously rinsing the tightly sealed vessels and devices (mills etc.) which are used for the manufacture and storage of the suspensions, with a $CO_2$-free inert gas such as, for example, argon or nitrogen. Such a process substantially retards the onset of reagglomeration.

The long-time stability can also be improved by adding an appropriate additional quantity of polyelectrolyte, which acts as a dispersing agent, shortly before the onset of reagglomeration or, preferably, after reagglomeration of the solid particles has started. Of particular interest in this connection is that also agglomerates which have already formed are destroyed without it being necessary to reapply mechanical energy, for example by milling or ultrasonification. The behaviour is particularly interesting because it offers the possibility of rendering suspensions which had become unusable as a result of reagglomeration fit for reuse by a simple measure, i.e. the addition of additional dispersing agents in the appropriate quantity.

In accordance with an advantageous embodiment of the method according to the invention, the optimum quantity of the dispersing agent lies in the range between 0.5 and 2 times the quantity of the dispersing agent added to the suspension in the manufacturing process.

The long-time stability can be very effectively improved by adding compounds containing specific anions. Such anions are, for example, sulphate $SO_4^{2-}$, carbonate $CO_3^{2-}$, iodate $IO_3^{31}$, chromate $CrO_4^{2-}$ and fluoride $F^-$. Particularly advantageous is the use of organic anions which, as volatile decomposition products, have the advantage that they can be removed in a residue-free manner in a later burn-out step. Such anions which have a stabilizing effect are, for example, oxalate, citrate, tartrate.

In accordance with a very advantageous embodiment of the method according to the invention, the above-mentioned anionic compounds are added in the form of their ammonium salts. Unlike metal salts, the addition of ammonium salts allows the cationic components to be burned out in a residue-free manner too.

In the manufacture of the suspension, the solid, the solvent, the dispersing agent and the anionic additive can be added in any desired sequence. However, it has proved to be very advantageous to use the anionic compound with water as the solvent and subsequently to disperse the solid particles finally in this solution before the dispersing agent is finally added.

The concentration of the anionic additive cannot be selected at will. Too low a concentration does not lead to the desired result, i.e. reagglomeration is not effectively retarded. An excess of the anionic compound, however, reduces the colloid-chemical stability of the solid particles, in particular of barium titanate, because it exerts an influence on the electrical double layer which is important for the repulsive forces between the particles. For most fine-powered solid particles the optimum quantity of the anionic additive lies in the range between 0.1 and 1.5 tool % of the solid content.

Particularly advantageous is the combined use of a number of the above-mentioned process steps.

For example, cooling to a temperature of preferably 15° C. can be combined with the exclusion of $CO_2$. It can actually be proved that the desired improvement of the long-time stability is enhanced when both measures are combined. Particularly efficacious is the simultaneous use of anionic additives, for example oxalate, $CO_2$-exclusion and cooling. The effect of the combined use of cooling and $CO_2$ exclusion is potentiated by pre-washing the solid particles.

Slip which is stabilized according to the invention can advantageously be used for the manufacture of thin ceramic foils having thicknesses below 25 μm, which are obtained by casting and drying.

In addition, electronic components or substrates can very advantageously be manufactured by subjecting green foils made from slip which is stabilized according to the invention to further processing, in particular stacking to obtain multilayer structures and burning to obtain dense bodies.

Surprisingly it has been found that all of the above measures for improving the long-time stability substantially reduce the concentration of free $Ba^{2+}$ ions in the aqueous phase, i.e. the leaching of barium taking place in an aqueous suspension of $BaTiO_3$ is reduced.

DESCRIPTION OF THE INVENTION

The invention will be explained in greater detail by means of exemplary embodiments.

Example 1

A quantity of 121.5 g of fine-powdered $BaTiO_3$ having an average particle size of 190 nm is dispersed together with 0.73 g of ammonium polyacrylate in 79.2 g of $H_2O$. The suspension is treated in an ultrasonic bath at a frequency of 20 kHz for 35 minutes. Subsequently, the suspension is ground in an attrition mill at 500 rpm.

Such a suspension was examined to determine the average particle size of the solid contained therein. Immediately after the manufacture, an average particle size of 190 nm was measured, which corresponds to the average particle size of the primary particles of the powder used. After 70 minutes the material began to reagglomerate. After two hours the average particle size was 550 nm.

Example 1.1

A suspension manufactured as described in example 1 is cooled during and after the production process to a temperature of 15° C. Reagglomeration does not start until after 235 minutes.

Example 1.2

A suspension prepared in accordance with example 1 is exposed during and after its manufacture to a $CO_2$-free $N_2$ atmosphere. The condition remains stable for 49 hours (compared with 70 minutes in example 1).

Example 1.3

A suspension manufactured in accordance with example 1 is allowed to stand until agglomeration has caused the average particle size to reach 500 nm. A quantity of 0.73 g of ammonium polyacrylate is again added to this unstable suspension while stirring lightly. Then the average particle size decreases rapidly and, after approximately 5 minutes, again reaches 190 nm. The suspension remains stable for 8 hours.

Example 1.4

A quantity of 200 g of very fine-powdered barium titanate having an average particle size of 190 nm are dispersed in 200 g of $H_2O$. The suspension is allowed to stand for 30 hours, while stirring. Subsequently, the solid is centrifuged off and the liquid phase removed. The sediment is again introduced into 200 g of $H_2O$ and centrifuged off after agitating for a short time. This washing process is repeated 4 times.

In accordance with example 1, the material thus washed is used for the manufacture of a suspension. The average particle size of 192 nm was determined immediately after the manufacture. Reagglomeration does not start until after 6 hours.

Example 1.5

A suspension as described in example 1 is manufactured. However, prior to dispersing the $BaTiO_3$, a quantity of 0.365 g of ammonium oxalate-monohydrate $(NH_4)_2C_2O_4.H_2O$ are added to the $H_2O$ used and dissolved therein. After the dispersal of the powder a quantity of 0.71 g of ammonium polyacrylate are added. The suspension thus prepared remains stable for 52 hours.

Example 2

A suspension manufactured in accordance with example 1 is rapidly introduced into a solution consisting of 7.6 g of polyvinyl alcohol as the binder and 98.7 g of $H_2O$, while stirring vigorously. The slip obtained is treated in an ultrasonic bath at a frequency of 20 kHz for 35 minutes. The average particle size of 197 nm is determined immediately after the manufacture. After 20 minutes the slip becomes unstable and reagglomeration begins.

Example 2.1

A slip which is manufactured in accordance with example 2 is cooled during and after its manufacture to a temperature of 15° C. Reagglomeration starts after 160 minutes.

Example 2.2

A slip manufactured in accordance with example 2 is treated in accordance with example 1.3. After adding ammonium polyacrylate the average particle size decreases to 202 nm. The slip thus obtained remains stable for 7.5 hours.

Example 2.3

A slip in accordance with example 2 is manufactured from barium titanate which is pre-leached and washed in accordance with example 1.4. The slip thus obtained does not become unstable until after 6.5 hours.

Example 2.4

A slip is prepared as described in example 2, except that instead of pure $H_2O$, a solution of 79.2 g of $H_2O$ and 0.365 g ammonium oxalate-monohydrate $(NH_4)_2C_2O_4.H_2O$ is used to disperse the powder. The slip thus obtained remains stable for 21 hours.

Example 2.5

During and after its preparation, a slip manufactured in accordance with example 2.4 is additionally cooled to a temperature of 15° C. and exposed to a $CO_2$-free $N_2$-atmosphere throughout the time. The slip remains stable for 53 hours.

The following Table gives a summary of the effects, described in the examples, of the individual stabilization measures on differently pretreated suspensions and slip.

TABLE time elapsed before the onset of reagglomeration of differently treated suspensions (without polyvinyl alcohol) and slip (with polyvinyl alcohol).

| Treatment | Suspension | Slip |
| --- | --- | --- |
| none | 70 min | 20 min |
| cooling 10° C. | 235 min | 160 min |
| $CO_2$ exclusion | 49 h | 70 min |
| additional appropriate quantity of dispersing agents | 8 h | 7.5 h |
| pre-leaching and washing | 6 h | 6.5 h |
| addition of oxalate | 52 h | 21 h |
| cooling + $CO_2$ exclusion + addition of oxalate | 73 h | 53 h |

We claim:

1. A method of manufacturing aqueous suspensions of deagglomerated finely powdered solid particles of barium titanate in a manner to prevent reagglomeration, said method comprising the steps of
   (a) forming an aqueous suspension of solid particles of finely powdered barium titanate and dispersing agents, and
   (b) carrying out at least one of the following sub-steps to prevent reagglomeration of said solid particles of finely powdered barium titanate for a given period of time:
      (i) washing said solid particles at least once in water before carrying out step (a),
      (ii) adding to said aqueous suspension anionic compounds of at least one of sulfates, carbonates, iodates, chromates, oxalates, citrates and tartrates,
      (iii) providing said aqueous suspension in a gaseous atmosphere free of $CO_2$,
      (iv) providing said aqueous suspension at a temperature of at most 20° C. and
      (v) adding additional dispersing agents to said aqueous suspension at least before reagglomeration of said solid particles begins.

2. A method according to claim 1, wherein all of said sub-steps (i)–(v) are carried out.

3. A method according to claim 1, wherein only said sub-step (i) is carried out.

4. A method according to claim 1, wherein only said sub-step (ii) is carried out by adding an oxalate.

5. A method according to claim 1, wherein only said sub-step (iii) is carried out.

6. A method according to claim 1, wherein sub-steps (ii), (iii) and (iv) are carried out, said sub-step (ii) being carried out by adding an oxalate.

7. A method according to claim 1, wherein only said sub-step (v) is carried out.

8. A method according to claim 1, wherein said solid particles of barium titanate have an average particle range less than about 0.5 μm.

9. A method according to claim 8, wherein said barium titanate solid particles have an average particle size ranging from about 0.1 to about 0.2 μm.

10. A method according to claim 1, wherein said additional dispersing agents in sub-step (v) comprise polyelectrolytes having a polymerization degree in the range from about 20 to about 100.

11. A method according to claim 10, wherein said additional dispersing agents are added in said sub-step (v) in an amount of about 0.3 to about 2.5 mg of polyelectrolyte/cm$^2$ of surface area of said solid particles.

12. A method according to claim 11, wherein said additional dispersing agents in said sub-step (v) comprise a polyacrylate.

13. A method according to claim 12, wherein said polyacrylate is ammonium polyacrylate.

14. A method according to claim 1, wherein said sub-step (v) is carried out by adding said additional dispersing agents in said sub-step (v) in an amount ranging from about 0.5 to 2 times the amount of said dispersing agents in said aqueous suspension in said step (a).

15. A method according to claim 14, wherein said additional dispersing agents in said sub-step (v) are added before reagglomeration of said solid particles.

16. A method according to claim 14, wherein said additional dispersing agents in said sub-step (v) are added upon beginning of reagglomeration of said solid particles.

17. A method according to claim 1, wherein said sub-step (ii) is carried out by adding at least one anionic compound as an ammonium salt.

18. A method according to claim 17, wherein said at least one anionic compound is added to said aqueous suspension before adding said dispersing agents in said step (a).

19. A method according to claim 17, wherein said at least one anionic compound is added in an amount of about 0.1 to 1.5 mol% of an amount of said solid particles in said aqueous suspension.

20. A method according to claim 1, wherein after adding said dispersing agents in said step (a), said aqueous suspension is subjected to an ultrasonic treatment in a frequency range of about 5 kHz to about 1 mHz, and thereafter a polymeric organic binder is added to said aqueous solution.

21. A method according to claim 20, wherein after addition of said binder, said aqueous suspension is subjected to another ultrasonic treatment in said frequency range of about 5 kHz to about 1 mHz.

22. A method according to claim 1, wherein a binder of polyvinyl alcohol is added to said aqueous suspension.

23. A method according to claim 1, wherein said gaseous atmosphere in sub-step (iii) is an inert gas atmosphere.

24. A method according to claim 23, wherein said inert gas atmosphere is one of an argon or a nitrogen atmosphere.

25. A method of manufacturing thin ceramic foils comprising the steps of forming slips of ceramic upon carrying out said method of claim 1 and forming thin ceramic foils having thicknesses ≦25 μm from said slips.

26. A method according to claim 25 further comprising the step of stacking a plurality of said thin ceramic foils to form ceramic multilayer capacitors.

* * * * *